United States Patent

Simpson

[11] Patent Number: 5,853,268
[45] Date of Patent: Dec. 29, 1998

[54] METHOD OF MANUFACTURING DIAMOND-COATED CUTTING TOOL INSERTS AND PRODUCTS RESULTING THEREFROM

[75] Inventor: Matthew A. Simpson, Sudbury, Mass.

[73] Assignee: Saint-Gobain/Norton Industrial Ceramics Corporation, Worcester, Mass.

[21] Appl. No.: 861,844

[22] Filed: May 22, 1997

Related U.S. Application Data

[62] Division of Ser. No. 424,025, Apr. 18, 1995, Pat. No. 5,643,523.

[51] Int. Cl.$^6$ ........................................ B23B 27/22
[52] U.S. Cl. .................... 407/119; 407/118; 408/145; 51/309; 427/249
[58] Field of Search .................. 407/119, 118, 407/120; 408/144, 145; 51/295, 309; 427/249

[56] References Cited

U.S. PATENT DOCUMENTS

| | | | |
|---|---|---|---|
| 4,605,343 | 8/1986 | Hibbs, Jr. et al. | 407/119 |
| 4,643,620 | 2/1987 | Fujii et al. | 407/119 |
| 4,966,501 | 10/1990 | Nomura et al. | 407/119 |
| 5,011,515 | 4/1991 | Frushour | 407/119 X |
| 5,294,381 | 3/1994 | Iguchi et al. | 264/25 |
| 5,326,195 | 7/1994 | Brox | 407/32 |
| 5,366,522 | 11/1994 | Nakamura et al. | 51/293 |
| 5,458,827 | 10/1995 | Holly | 264/400 |
| 5,491,028 | 2/1996 | Sarin et al. | 428/408 |
| 5,643,523 | 7/1997 | Simpson | 407/118 X |

FOREIGN PATENT DOCUMENTS

| | | |
|---|---|---|
| 442 303 A1 | 8/1991 | European Pat. Off. |
| 61-0142003 | 6/1986 | Japan ................. 407/119 |

Primary Examiner—Andrea L. Pitts
Assistant Examiner—Henry W. H. Tsai
Attorney, Agent, or Firm—Volker R. Ulbrich

[57] ABSTRACT

A method of making a diamond-coated insert includes, obtaining a substrate of durable and diamond adherent material having a substantially smooth surface on which is coated a diamond layer using any known CVD technique, and partitioning the diamond covered substrate with a laser beam into multiple inserts with desired geometries. If desired, the insert edges and corners may be thereafter machined or ablated until the desired smoothness and finish are achieved, and a fastening throughbore may be preformed or drilled in the center of each insert. The diamond-coated inserts as formed have a top surface entirely coated by a surface layer of diamond of a first thickness, and at least one rake face which is not diamond-coated beyond the surface layer of diamond.

7 Claims, 4 Drawing Sheets

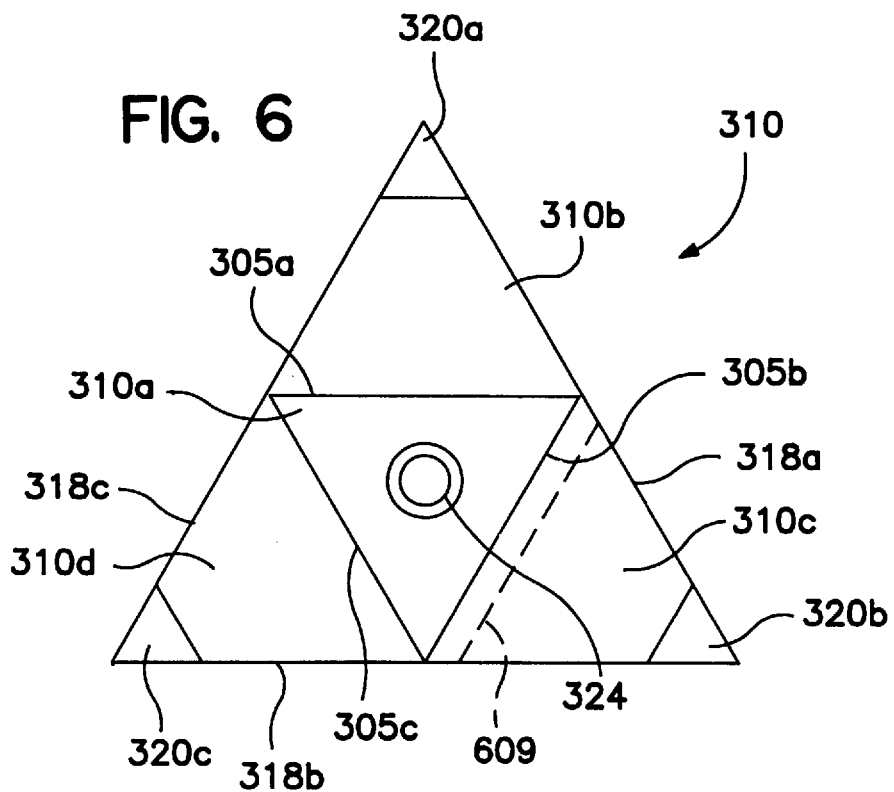
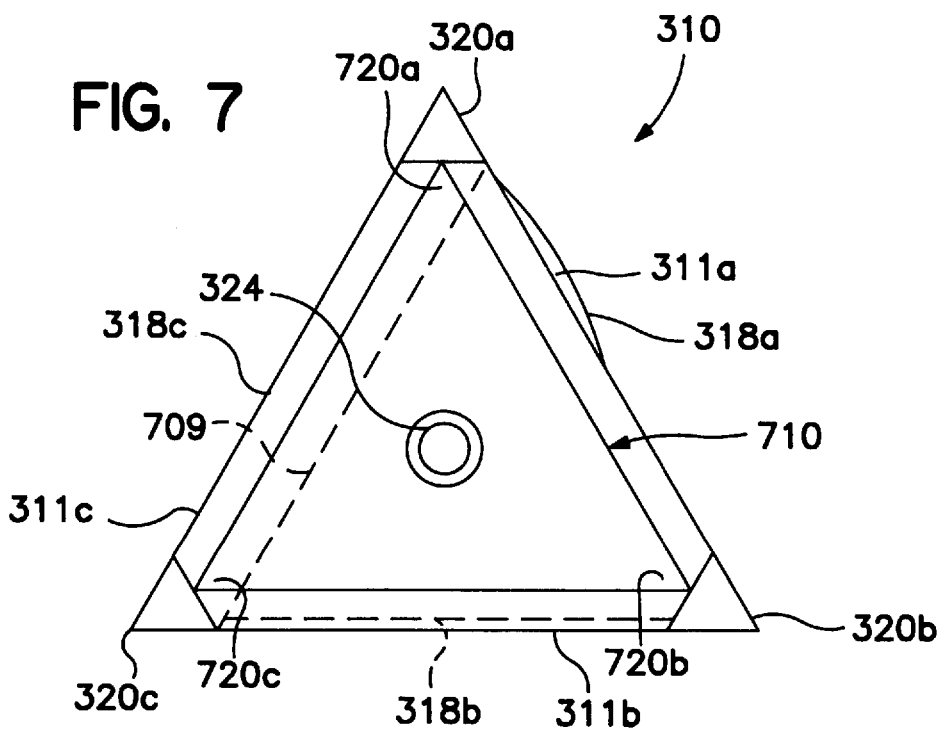

METHOD OF MANUFACTURING DIAMOND-COATED CUTTING TOOL INSERTS AND PRODUCTS RESULTING THEREFROM

This is a divisional of application Ser. No. 08/424,025 filed on Apr. 18, 1995, now U.S. Pat. No. 5,643,523.

BACKGROUND OF THE INVENTION

1. Field of the Invention

This invention relates broadly to cutting tools. More particularly, this invention relates to diamond-coated inserts for cutting tools, and a method of manufacturing these diamond-coated inserts.

2. State of the Art

In the machining industry, the type and shape of the cutting point used by a machine to cut a given material is often crucial to its efficiency and accuracy. As illustrated in prior art FIG. 1, this point is usually provided on a detachable piece of material, known as an insert 102, which is made of a very hard material and shaped according to the type of cut desired on the workpiece 101. The cutting tool insert 102 is often attached by a threaded screw 103 to a toolholder 104, which in turn may be fastened to a part of a machine, such as, for example, the carriage 106 of a lathe (not shown). Typically, the insert 102 has multiple corner portions 108a–d for cutting, so that when one corner 108a of the insert 102 is worn, the insert 102 can be repositioned in the toolholder 104 to expose another, unused corner 108b–d. In this manner, a single insert can be repositioned until all of its corners 108a–d are worn. Frequently, an insert has the shape of a triangle or quadrangle (although circular and hexagonal inserts are known) with each corner 108a–d of the insert being used as a cutting point.

Although inserts may be manufactured from a variety of materials, such as metals, carbides and ceramics, for cutting many materials it is preferable to use diamond. With the development of synthetic and thin film diamonds, the use of diamond in cutting tools has become more feasible and prevalent in the cutting tool industry.

Presently, diamond for cutting tools is available in three distinct forms: single crystals; high temperature/high-pressure polycrystalline (PCD) blanks; and, more recently, chemical vapor deposition (CVD) thick-film blanks and thin-film coatings. Due to the different manufacturing processes involved which emphasize certain characteristics at the expense of others, each form is suited to a particular range of applications.

Single crystal inserts are manufactured by shaping natural or artificial diamonds in the form of the cutting sections of an insert, and then brazing the finished diamond onto a substrate. PCD diamond inserts are made by heating and pressurizing a tightly packed mass of diamond particles along with a certain percentage of a sintering aid, typically cobalt. During the sintering process, the cobalt melts and infiltrates the voids between diamond particles. The resulting blank must then be machined to have the desired cutting geometry. CVD diamond inserts are made by either coating a thin film of diamond on a tungsten carbide or ceramic substrate having the desired cutting geometry, or by brazing a free-standing CVD diamond film having the desired cutting shape to the top of the insert where the cutting is to take place. A difficulty common to all three methods of diamond insert manufacture (except where the cut substrate is subjected directly to CVD coating), is that it is often extremely difficult to machine the diamond covered inserts to the desired shape due to the hardness of diamond. Because the inserts must be individually machined, potential inconsistencies in the quality of the inserts are created. As a result, once manufactured, each insert must be quality tested for conformity with other inserts. Furthermore, whenever new insert shapes and sizes are desired, new tools and methods for machining the inserts are required.

As suggested above, in order to substantially eliminate machining, it is known to prepare individual substrates to the desired shape and size and place them in a CVD reactor where the entire tool is subsequently diamond-coated. Consistency, however, is difficult to achieve, as the individually cut substrates may have slightly different geometries. In addition, since the diamond growth rate in a CVD reactor may vary with each use, slightly different insert geometries will result with each use of the CVD reactor. Another potential problem is with the handling requirements of present CVD manufacturing methods. As each insert is manufactured and shaped independently, a large number of substrates must be placed in a carefully chosen array, diamond-coated using some appropriate method, inspected, and finally repacked. This entails frequent handling of the inserts. In addition, each different insert geometry requires a specially cut substrate. Inventory requirements and manufacturing time are thereby increased as a result. Also, there is a tendency for diamond coating processes to be sensitive to the size and shapes of each individual insert, thus often requiring manufacturing test runs before an insert with a new size or shape can be made.

In addition to the manufacturing and quality control difficulties in producing the diamond-coated inserts of the prior art, the resulting inserts suffer from certain shortcomings. For example, whenever the cutting point of an insert becomes dull, which may happen frequently depending on the material being worked, the insert must either be discarded or removed from the tool holder and carefully reground. Where only the corners of the insert are diamond-coated, the cutting points may only be reground a limited number of times before the entire insert must be discarded. In the situation where the entire insert substrate is CVD coated with a diamond layer, the diamond layer extends not only along the rake face of the insert but down the flank of the insert. Because of the diamond-coated flank, however, it is extremely difficulty to resharpen the insert. In fact, even if resharpening can be accomplished, the resulting insert will have a different flank configuration than when originally manufactured.

SUMMARY OF THE INVENTION

The novel method of the present invention generally comprises coating a diamond layer onto a substantially smooth surface of a substrate of durable and diamond-adherent material using any known CVD technique, and then partitioning the diamond-coated substrate into multiple inserts having desired geometries. Preferably, the partitioning is accomplished using a laser beam. Where the desired insert shape is known in advance, the substrate surface may be prepared with grooves along the laser beam cutting planes in order to further minimize manufacturing time.

Once the inserts are cut and separated, if desired, the edges and corners of the insert can be machined until the desired smoothness and finish are achieved. A fastening throughbore is optionally machined into the finished inserts using any known drilling method, such as laser drilling. The finished insert may then be used in conjunction with a tool holder and cutting lathe in a manner similar to that described in the prior art. In certain other cases, rather than using the partitioned coated substrate as cutting tool inserts, the diamond-coated substrate can be bonded to a second substrate either by brazing or adhesive. The diamond surface could then be finished by ablation or another desired finishing technique.

The results of the method of the invention are typically cutting inserts which generally include a substantially polygonal shaped substrate made from a durable material having strong diamond adherent properties, where a rake surface of the insert is CVD coated with a diamond layer, and where the flank of the insert is not diamond-coated beyond the thickness of the CVD diamond rake surface. The insert optionally contains a throughbore extending from the center of the diamond-coated surface to the center of the bottom surface of the insert. When a throughbore is provided, it is dimensioned to receive a coupling means for affixing the cutting insert to a tool holder.

The method of manufacturing the insert of the invention is simple and cost-efficient, provides consistent results, and permits inserts of different shapes to be easily formed. The resulting insert of the present invention exhibits a much longer lifespan than conventional inserts due to the fact that in resharpening the insert, the entire surface of the cutting insert can be used. In particular, when two of the corners of the insert are worn, the edges therebetween may be used as a cutting tool simply by grinding the insert to the desired shape. Several grinding techniques are available for this purpose, such as by cutting the original insert into multiple smaller inserts or polishing down the original insert to expose unused portions of the diamond coating. Because the diamond coating is relatively thin, and the flank of the insert is not diamond-coated, the present insert also possesses a potential for resharpening not possessed by other CVD diamond-coated tools.

BRIEF DESCRIPTION OF THE DRAWINGS

FIG. 6 is a top view of the cutting insert of FIG. 4 and illustrates a first manner in which it may be ground for reuse after the original corners are worn; and FIG. 7 is a top view of the cutting insert of FIG. 4 and illustrates a second manner in which it may be ground for reuse after the original corners are worn.

DETAILED DESCRIPTION OF THE PREFERRED EMBODIMENTS

Figure 2:
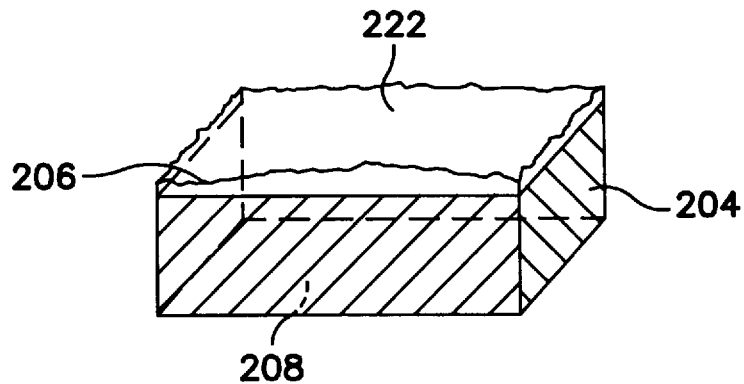
FIG. 2 is a perspective view of a diamond-coated cutting insert substrate obtained in the first step of the manufacturing method of the invention.
Figure 3:
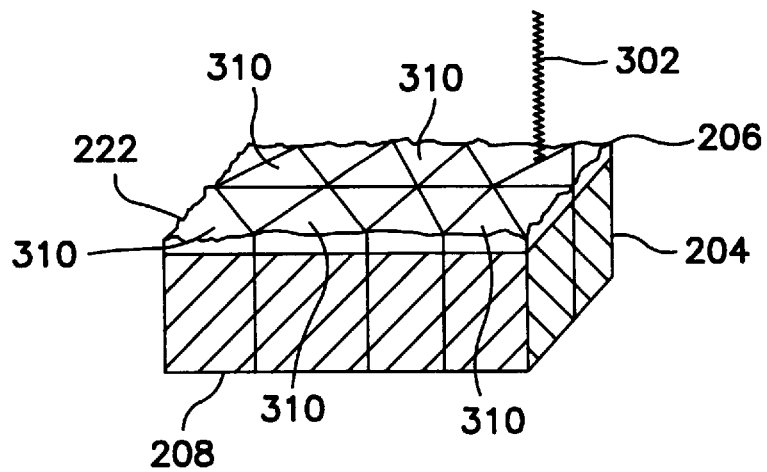
FIG. 3 is a perspective view of a partitioned diamond-coated cutting insert substrate obtained in the second step of the manufacturing method of the invention.
Figure 4:
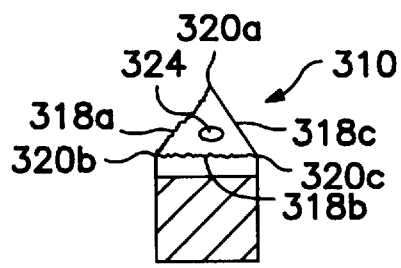
FIG. 4 is a perspective view of a finished diamond-coated cutting insert obtained in the third step of the manufacturing method of the invention.

Referring now to FIGS. 2–4, a method of manufacturing the diamond-coated inserts of the invention is illustrated. A 10 cm by 10 cm rectangular substrate 204 having a first surface 206 and a second surface 208 is coated on its first surface 206 with a diamond layer 222 having a thickness in the 2–200 $\mu$m range. The coating of the diamond layer may be accomplished by using any known CVD technique. It is important that the substrate 204 be sufficiently stiff, or subsequent abrading of the resulting insert will flex the substrate 204 excessively, causing the diamond layer 222 to spall off (i.e.. chip or splinter), as is the case with most materials having Young's modulus less than 50 GPa (GigaPascals), such as graphite or hexagonal Boron Nitride. A further requirement is that the diamond layer 222 be adherent to the substrate 204. Materials sufficiently stiff and adherent to diamond include various grades of Sic, $Si_3N_4$ or tungsten carbide. In the case of tungsten carbide, it may be necessary to introduce an interlayer to compensate for factors contributing to non-adherence to the diamond coating. Other materials may also require special methods because of the mismatch in thermal expansion between the substrate and diamond coating.

The thickness range of the diamond layer coating 222 is such as to allow variation from application to application. Specific thickness values are determined by economic factors and by the necessity of maintaining the bond between the substrate 204 and the diamond layer 222. Generally, the wear resistance of the insert 310 (see FIG. 4) will be increased by increasing the thickness of the diamond layer 222, whereas the cost of making the insert will be reduced by reducing the thickness of the diamond layer 222. The tendency for the diamond layer 222 to spall will also be limited by reducing the thickness of the diamond layer. In addition, if the insert were intended to be used for machining soft but abrasive materials such as filled plastics, as thick a diamond layer 222 as manageable is preferred. Machining stiffer and tougher materials, such as metals, however, would require a thinner layer to prevent spalling of the diamond layer.

Turning now to FIG. 3, once coated with the diamond layer 222, the rectangular substrate 204 is partitioned using a laser beam 302 into multiple triangular inserts 310. The laser beam 302 is preferably arranged perpendicular to the first surface 206 of the substrate 204 such that the walls of the resulting inserts are vertical. Where the desired insert shape is known in advance, the substrate 204 may be prepared with grooves along the laser beam 302 cutting planes (not shown) in order to further minimize manufacturing time. The cutting laser (not shown) must have a narrow beam 302 and a high power density, such as that produced by a Nd-YAG laser, to avoid damaging the diamond coating 222. Although the laser beam 302 is disclosed as being perpendicular to the first surface 206 of the substrate 204, an angled laser beam may also be used where a positive rake to the tool (i.e., a flank to rake face angle of less than ninety degrees) is desired. Similarly, it will be appreciated that the inserts 310 may be cut into any desired shape, depending on the intended application of the insert.

As seen in FIG. 4, after the triangular inserts 310 are cut and separated, the sides 318a, 318b, 318c and corners 320a, 320b, 320c of the insert 310 may be ablated using a trimming laser or other conventional grinders until the desired finish is achieved. However, by skillful control of the initial cut, the cutting and trimming operations may be one and the same. In certain cases, the insert 310 may be bonded to a second substrate (not shown) either by brazing or adhesive bonding before being ablated and finished. The throughbore 324 of the insert 310 (if desired) may then be machined and finished by any known drilling method, such as laser drilling or diamond core drilling. The finished insert may then be used in conjunction with a tool holder and/or cutting lathe.

It will be appreciated that the method of the invention provides for various improvements over the prior art. First, since the substrate 204 does not need to be cut beforehand and given a specific shape prior to being diamond-coated, the process is flexible and allows for making custom insert geometries. Second, the use of a laser beam 302 to cut the inserts 310 permits the inserts 310 to have extremely sharp and accurate cutting corners 320a–c and sides 318a–c. Third, as the process involves no small parts until after the diamond-coated substrate is cut by the laser, fewer handling difficulties are encountered in the CVD reactor. Fourth, the large scale and consistent geometry of substrates used in the CVD reactor allow the reactor to operate at higher heat fluxes during deposition, and hence produce higher diamond deposition growth rates.

Figure 5:
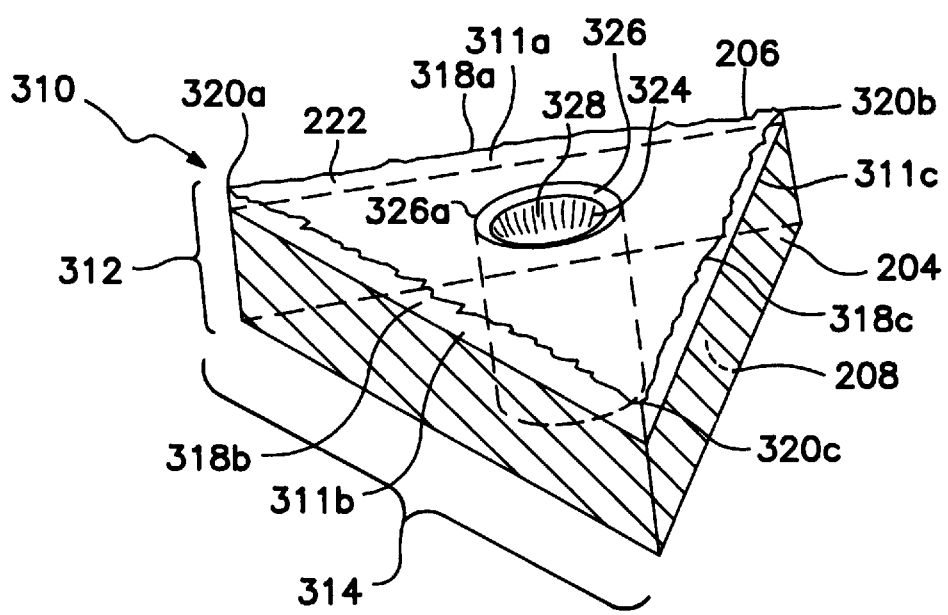
FIG. 5 is a magnified perspective view of the finished diamond-coated cutting insert of FIG. 4.

The insert 310 generated by the method of the invention is seen in more detail in FIG. 5. As suggested above with reference to FIGS. 2–4, the cutting insert 310 generally includes a substrate 204 made from a material cut to the shape of an equilateral triangle. Insert 310 includes first and second opposed surfaces 206, 208 defined by the equal side surfaces of the triangle 311a, 311b, 311c, which in turn have a defined height 312 and length 314. The first surface 206 and the side surfaces 311a, 311b, 311c define edges 318a, 318b, 318c which meet at corners 320a, 320b, 320c. The first surface 206 is coated with a typically 2–200 µm thick diamond layer 222 as illustrated.

Figure 1:
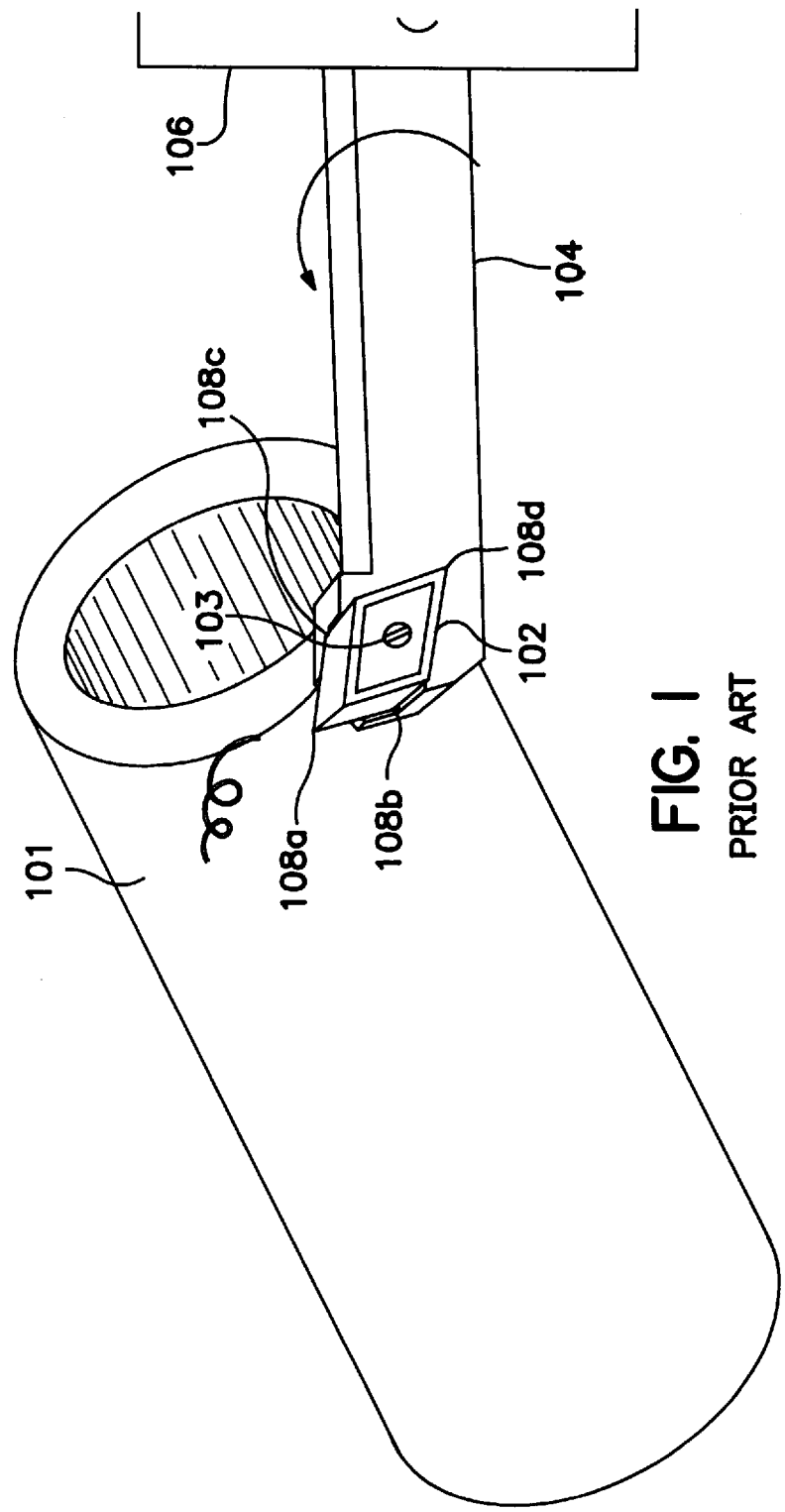
FIG. 1 is a perspective view of a prior art cutting tool insert with a tool holder and a workpiece.

The shown insert 310 is also provided with a throughbore 324 extending from the center of the second surface 208 to the center of the first surface 206 and through the diamond layer 222. The throughbore 324 contains a head portion 326 located near the first surface 206 and a neck portion 328 located near the second surface 208. The head portion 326 has the shape of an inverted truncated cone with diameter increasing from its base 326a to its ceiling 326b. The diameter of the head portion 326 at its base 326a is equal to the diameter of the neck portion 328. The diameter of the head portion 326 increases from its base 326a, until it reaches the first surface 206. It will thus be appreciated by those skilled in the art, that the throughbore 324 is configured and dimensioned to receive the head and unthreaded body portion of a fastening screw used to attach the insert 310 to a toolholder as shown in the prior art FIG. 1. In particular, the head portion 326 of the throughbore 324 is shaped to receive the head of a fastening screw, while the neck portion 328 is shaped to receive the unthreaded portion of the body of a fastening screw. As will be discussed hereinafter with reference to FIG. 3, additional throughbores in the insert 310 may be provided if desired.

In a typical cutting tool insert, each side 311a–c of the substrate 204 is approximately 12 mm in length, and the thickness of the insert is 4 mm. The head portion 326 of the throughbore 324 has a diameter ranging from 4 mm to 7 mm, and the neck portion 328 has a 3 mm diameter. The material used for the insert 310 is preferably extremely durable and has strong diamond adherent properties. Suitable materials for the substrate 204 include silicon carbide (SiC), silicon nitride ($Si_3N_4$), tungsten carbide (WC), other transition metal carbides, nitrides and borides, zirconium alumina ($Al_2O_3$-$ZrO_2$), and alumina ($Al_2O_3$).

The insert 310, as described above, exhibits a much longer lifespan than conventional inserts due to the fact that the entire length of the insert edges 318a, 318b, 318c can be used as well as the corners 320a, 320b, 320c, as further shown in FIGS. 6 and 7.

Referring now to FIG. 6, a first method of grinding the insert 310 of the invention is illustrated. Once the corners 320a, 320b, 320c of the insert 310 are worn, the insert 310 is cut into four smaller identical triangular inserts 310a, 310b, 310c, 310d. This is accomplished by cutting the original insert 310 along the three lines 305a, 305b, 305c connecting the centers of each edge 318a, 318b, 318c of the insert 310. The four new inserts 310a–310d are then machined and finished as desired. Three of the cut inserts 310b, 310c, 310d each contain one of the worn corners 220a, 220b, 220c of the original insert 310 and thus have only two usable corners. In addition, these inserts 310b, 310c, 310d can be further machined to provide a throughbore for attachment to a cutting tool if needed, unless the throughbore was already provided as previously mentioned. The fourth cut insert 310a, however, has three usable corners and includes the throughbore 324 of the original insert 310 in its center. It will further be appreciated that, depending on the size of the original insert 310 and the desired use of the cut inserts 310a–310d, the outer cut inserts 310b, 310c, 310d and inner cut insert 310a may similarly be reground for reuse, such as by grinding one edge 305b to reveal two unused corners, as shown by line 609 for the cut insert 310c. In this manner, the diamond-coated edges 318a, 318b, 318c of the original insert 310 are used to some degree before the insert 310 is discarded.

A second method of regrinding the original insert 310 once the corners 320a, 320b, 320c are worn is illustrated in FIG. 7. After the original used corners 320a, 320b, 320c are worn, each side 311a, 311b, 311c is ground evenly such that the resulting ground insert 710 is similar to the original insert 310 except that it has three unused diamond-coated corners 720a, 720b, 720c and is smaller. The new insert 710 can be reground in a similar fashion once its corners 720a–720c become worn. This process may be repeated for as long as sufficient material from the original insert 310 remains for the desired use of the inserts. It will also be appreciated that instead of repeatedly grinding all three sides to provide smaller and smaller insert with three new corners, only one side need be ground to provide two new corners as discussed above with respect to line 609 of FIG. 6 and as suggested by dashed line 709 of FIG. 7.

As the diamond layer 222 is relatively thin, the present insert 310 possesses a potential for resharpening not possessed by other diamond-coated tools. Unlike conventional diamond-coated tools, where the diamond coating extends far down the flank face of the tool and cannot be easily resharpened due to the inherent hardness of diamond, the insert 310 of the invention may easily be resharpened without affecting its cutting geometry. In particular, the substrate 204 may often wear away evenly with the thin diamond layer 222 whenever the insert is used to cut a workpiece, thus maintaining the sharpness of the original cutting portion of the insert 310. In the frequent case where the substrate 204 wears away faster than the thin diamond layer 222, a sharp edge on the top of the tool will be maintained, and further sharpening will not be required.

There have been described and illustrated herein diamond-coated inserts for cutting tools, and a method of making the same. While particular embodiments of the invention have been described, it is not intended that the invention be limited thereto, as it is intended that the invention be as broad in scope as the art will allow and that the specification be read likewise. Thus, while a triangular diamond-coated insert is disclosed as being manufactured from a diamond-coated substrate, other geometric shapes may be manufactured as well, such as a rhombus, rectangle or other polygon. Similarly, while a rectangular substrate is shown as the starting element of the method invention, it will appreciated that any shaped substrate can be used.

Furthermore, while particular cutting and finishing techniques have been disclosed with reference to the method, other cutting and finishing techniques may be used as well. For example, while laser cutting and finishing means are suggested, diamond-coated drills and grinds can also be used. In addition, while particular grinding techniques for regrinding cutting inserts having worn cutting corners and sides have been described and illustrated, other grinding techniques may be used as well. For example, while several grinding techniques for cutting or polishing a used cutting insert into triangular shapes have been disclosed, grinding techniques for cutting or polishing a used cutting insert into rectangular shapes or other polygonal shapes may also be used. It will therefore be appreciated by those skilled in the art that yet other modifications could be made to the provided invention without deviating from its spirit and scope as claimed.

I claim:

1. An as-manufactured diamond-coated insert for a tool, comprising:

a polygonal substrate having a first, rake face entirely coated by a surface layer of CVD diamond of a first thickness, and having at least two flank faces adjoining the rake face which are not diamond-coated beyond said surface layer of diamond.

2. An as-manufactured diamond-coated insert according to claim 1, wherein:

said polygon is one of a quadrangle and a triangle.

3. An as-manufactured diamond-coated insert according to claim 2, wherein:

said substrate is a material selected from the group consisting of silicon carbide, silicon nitride, tungsten carbide, zirconium alumina, and alumina.

4. An as-manufactured diamond-coated insert according to claim 1, wherein:

said polygonal substrate has a second surface which is substantially parallel and similarly shaped to said first surface, and, said as manufactured insert has a throughbore extending from a center of said first surface to a center of said second surface, said throughbore being dimensioned to receive a fastening means for fastening said insert to a tool holder.

5. An as-manufactured diamond-coated insert according to claim 1, wherein:

said diamond layer is between approximately 2 and 200 microns thick.

6. A diamond-coated insert, comprising:

a substrate portion having a first, rake face coated by a surface layer of CVD diamond, and having at least two flank faces adjoining the rake face which are not diamond-coated beyond said coated rake face layer of diamond, wherein said diamond-coated insert was formed by a process of cutting a larger diamond-coated substrate including said substrate portion into a plurality of pieces, where one of said plurality of pieces is said diamond-coated insert.

7. A diamond-coated insert according to claim 6, wherein:

said diamond surface layer is between two and two hundred microns thick, said larger diamond-coated substrate was coated according to a Chemical Vapor Deposition (CVD) technique, and said diamond-coated insert is polygonal in shape.

* * * * *